(12) United States Patent
Wu et al.

(10) Patent No.: US 11,193,907 B2
(45) Date of Patent: Dec. 7, 2021

(54) NITROUS OXIDE CONCENTRATION DETECTOR

(71) Applicant: DENSO CORPORATION, Kariya (JP)

(72) Inventors: Hao Wu, Nisshin (JP); Shota Hagino, Nisshin (JP); Hiroki Ichikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 265 days.

(21) Appl. No.: 16/448,092

(22) Filed: Jun. 21, 2019

(65) Prior Publication Data

US 2019/0391108 A1   Dec. 26, 2019

(30) Foreign Application Priority Data

Jun. 26, 2018 (JP) .............................. JP2018-121025

(51) Int. Cl.
*G01N 27/407* (2006.01)
*G01N 27/406* (2006.01)
*G01N 27/49* (2006.01)

(52) U.S. Cl.
CPC ....... *G01N 27/4067* (2013.01); *G01N 27/407* (2013.01); *G01N 27/49* (2013.01)

(58) Field of Classification Search
CPC .............. G01N 27/407; G01N 27/4065; F01N 2560/026
See application file for complete search history.

(56) References Cited

FOREIGN PATENT DOCUMENTS

| JP | 59-091358 | | 5/1984 | |
| JP | 62-112050 A | * | 5/1987 | ............ G01N 27/46 |
| JP | 2002-031619 | | 1/2002 | |
| JP | 2006-284207 | | 10/2006 | |

OTHER PUBLICATIONS

An EPO computer-generated English language translation of teh Description section of Usui et al. JP 62-112050 A, patent published May 23, 1987; downloaded May 8, 2021. (Year: 1987).*

* cited by examiner

*Primary Examiner* — Alexander S Noguerola
(74) *Attorney, Agent, or Firm* — Nixon & Vanderhye P.C.

(57) ABSTRACT

A nitrous oxide concentration detector includes a control unit. In the control unit, a first control section controls a voltage application section and a heater to achieve a first state in which nitric oxide undergoes electrolysis and nitrous oxide does not undergo electrolysis. A second control section controls the voltage application section and the heater to achieve a second state in which nitric oxide and nitrous oxide undergo electrolysis. An estimation section estimates an estimated current that flows between a first electrode and a second electrode due to electrolysis of nitric oxide in the second state based on a first current detected by a current detector in the first state. A calculation section calculates a nitrous oxide concentration based on a third current obtained by subtracting the estimated current estimated by the estimation section from a second current detected by the current detector in the second state.

10 Claims, 10 Drawing Sheets

NITROUS OXIDE CONCENTRATION DETECTOR

CROSS-REFERENCE TO RELATED APPLICATION

This application is based on and claims the benefit of priority from earlier Japanese Patent Application No. 2018-121025 filed Jun. 26, 2018, the description of which is incorporated herein by reference.

BACKGROUND

Technical Field

The present disclosure relates to a device for detecting the concentration of nitrous oxide ($N_2O$).

Related Art

Conventionally, a device is known that calculates a nitrous oxide concentration. The device includes an electrolyte as a cation conductor and an electrode layer consisting of a nitrous oxide decomposition catalyst formed on one side of the electrolyte. The device measures an electromotive force generated between the electrolyte and the electrode layer to calculate the nitrous oxide concentration from the electromotive force.

DESCRIPTION OF SPECIFIC EMBODIMENTS

In the known device, if nitric oxide (NO) is present together with nitrous oxide, the measured electromotive force is affected by the nitric oxide since the nitric oxide is decomposed more easily than the nitrous oxide through electrolysis. Thus, the known device, as disclosed in JP-A-2006-284207, may possibly be unable to accurately calculate the nitrous oxide concentration.

In view of the foregoing, it is desired to have a nitrous oxide concentration detector that accurately detects the nitrous oxide concentration even if nitric oxide is present.

Hereinafter, a nitrous oxide concentration detector according to one embodiment that detects the nitrous oxide concentration in the air or in a specific atmosphere will be described with reference to the drawings.

Figure 1A:
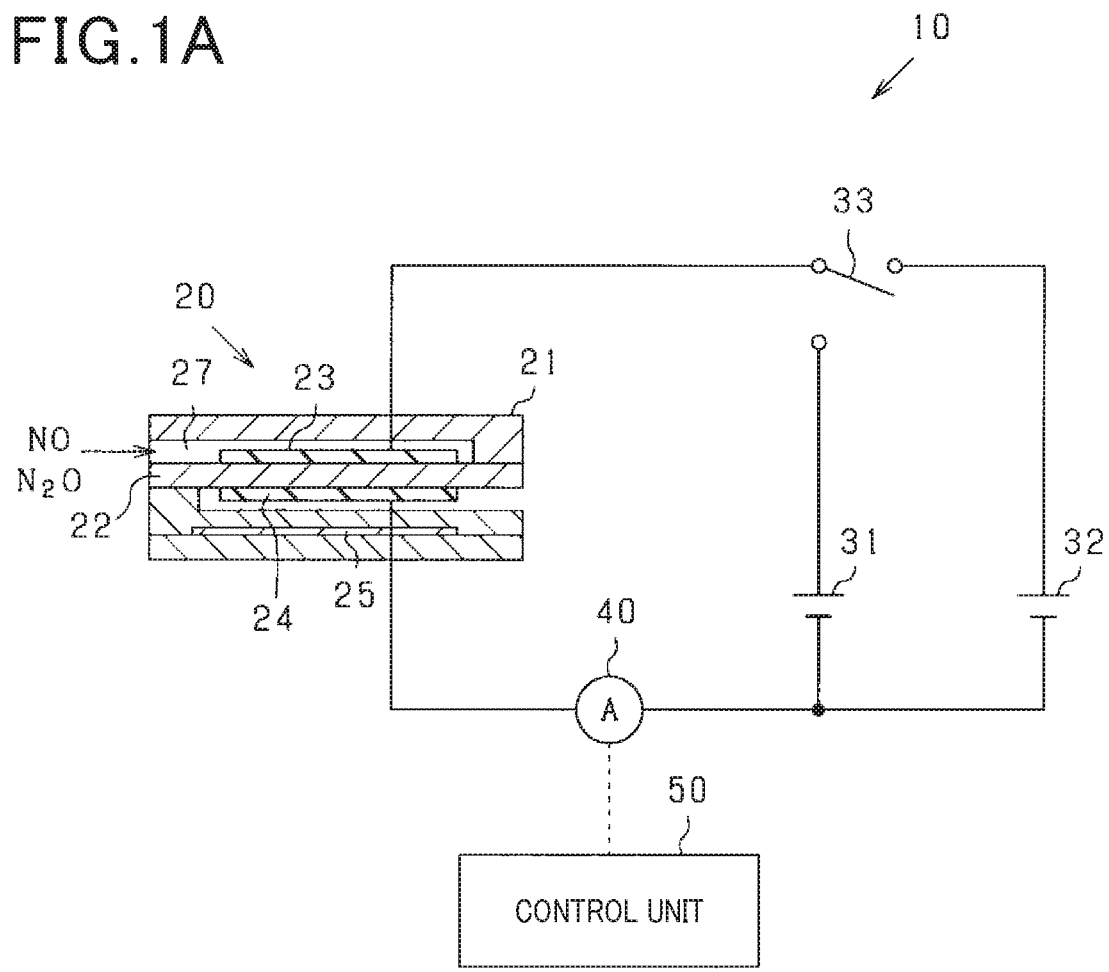
FIG. 1A is a schematic diagram illustrating a configuration of a nitrous oxide concentration detector.

As shown in FIG. 1A, a nitrous oxide concentration detector 10 includes a sensor section 20, a first power supply 31, a second power supply 32, a switch 33, an ammeter 40, and a control unit 50.

The sensor section 20 includes a housing 21, a solid electrolyte 22, a detection electrode 23, a reference electrode 24, and a heater 25. The housing 21 is shaped like a rectangular parallelepiped and accommodates the solid electrolyte 22, the detection electrode 23, the reference electrode 24, and the heater 25. The housing 21 defines a measurement chamber 27 in which the nitrous oxide concentration is measured. The measurement chamber 27 receives gas to be measured including nitric oxide (NO) and nitrous oxide ($N_2O$).

The solid electrolyte 22 (electrolyte) is formed of yttrium oxide ($Y_2O_3$) stabilized zirconia (YSZ) having oxygen ion conductivity into a plate. The detection electrode 23 is mounted on one of the main surfaces (the surfaces with the greatest area) of the solid electrolyte 22, and the reference electrode 24 is mounted on the other surface. The detection electrode 23 (first electrode) is formed of platinum (Pt) into a plate and is located in the measurement chamber 27. The reference electrode 24 (second electrode) is formed of YSZ into a plate and is connected to the detection electrode 23 through the solid electrolyte 22.

The heater 25 heats the solid electrolyte 22, the detection electrode 23, and the reference electrode 24 and adjusts the temperature of the solid electrolyte 22. The heater 25 is controlled by the control unit 50 so that the temperature of the solid electrolyte 22 is heated to a target temperature.

The solid electrolyte 22, the detection electrode 23, and the reference electrode 24 configure an element section, to which the first power supply 31 and the second power supply 32 are connected through the switch 33 in parallel. The first power supply 31 is a power supply that applies, for example, 0.2 V (first voltage) between the detection electrode 23 and the reference electrode 24. The cathode of the first power supply 31 is connected to the detection electrode 23 through the switch 33, and the anode of the first power supply 31 is connected to the reference electrode 24 through the ammeter 40. The second power supply 32 is a power supply that applies, for example, 0.5 V (second voltage) between the detection electrode 23 and the reference electrode 24. The cathode of the second power supply 32 is connected to the detection electrode 23 through the switch 33, and the anode of the second power supply 32 is connected to the reference electrode 24 through the ammeter 40. The switch 33 is controlled by the control unit 50 and switches the power supply that applies a voltage to the element section between the first power supply 31 and the second power supply 32. The first power supply 31, the second power supply 32, and the switch 33 configure a voltage application section.

The ammeter 40 (current detector) detects a current (hereinafter, referred to as the element current) that flows between the detection electrode 23 and the reference electrode 24. The current detected by the ammeter 40 is input to the control unit 50.

The control unit 50 is configured by a microcomputer including, for example, a CPU, a ROM, a RAM, a storage device, and an I/O interface. The control unit 50 controls the heater 25 so that the impedance of the solid electrolyte 22 is brought to an impedance that corresponds to the target temperature based on the relationship between the impedance and the temperature of the solid electrolyte 22. In this manner, the temperature of the solid electrolyte 22 (hereinafter, referred to as the element temperature) is maintained at the target temperature. The control unit 50 switches the switch 33 to control the voltage (hereinafter, referred to as the applied voltage) to be applied between the detection electrode 23 and the reference electrode 24.

Figure 2:
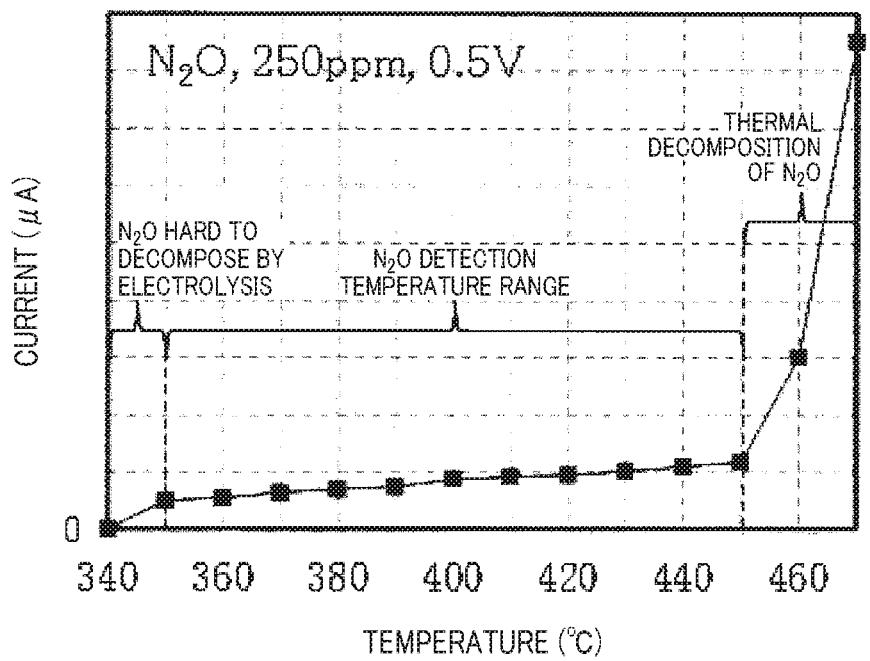
FIG. 2 is a graph showing the relationship between the element temperature and the element current of nitrous oxide.

FIG. 2 is a graph showing the relationship between the element temperature and the element current. The graph shows a case in which the concentration of the nitrous oxide is 250 ppm, and the applied voltage is 0.5 V.

As shown in FIG. 2, when the element temperature becomes less than 350° C., the nitrous oxide is hard to decompose by electrolysis, so that the element current is rapidly decreased. When the element temperature becomes greater than or equal to 350° C., the nitrous oxide decomposes by electrolysis in accordance with the following equation, where $O^{2-}$ represents divalent oxygen ions.

$$N_2O+2e \rightarrow N_2+O^{2-}$$

When $O^{2-}$ moves in the solid electrolyte 22, the element current flows. In the range in which the element temperature is 350 to 450° C., as the element temperature increases, the element current gradually increases. When the element temperature becomes higher than 450° C., the thermal decomposition of the nitrous oxide is started. Thus, the element current is rapidly increased. In the range in which the element temperature is higher than 450° C., the element current is increased by the element current caused due to the thermal decomposition of the nitrous oxide, that is, the current not caused due to the electrolysis of the nitrous oxide.

Figure 3:
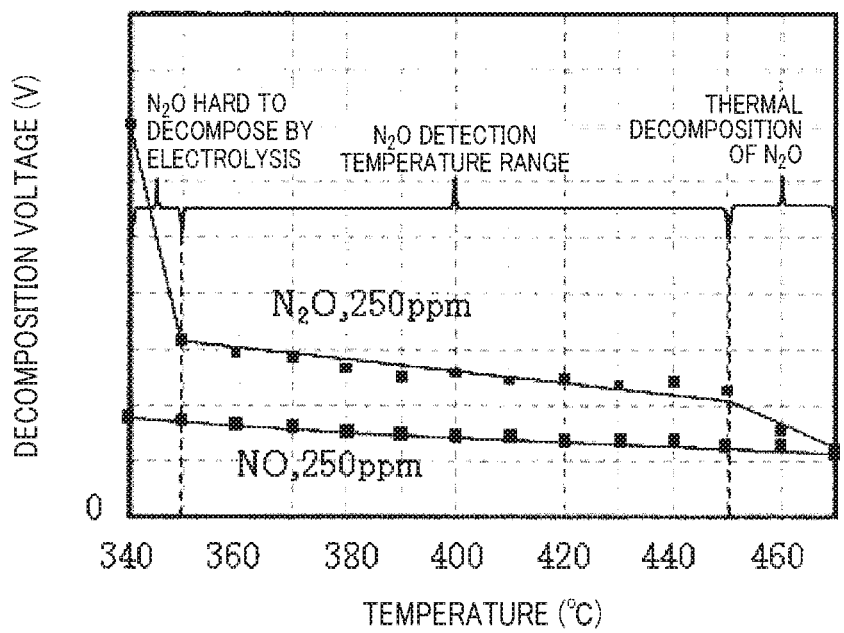
FIG. 3 is a graph showing the relationship between the element temperature and the decomposition voltage.

FIG. 3 is a graph showing the relationship between the element temperature and the decomposition voltage. The graph shows a case in which the nitrous oxide is 250 ppm and a case in which the nitric oxide is 250 ppm.

As shown in FIG. 3, when the element temperature becomes less than 350° C., the nitrous oxide is less likely to decompose by electrolysis, and the decomposition voltage of the nitrous oxide is rapidly increased. In the range in which the element temperature is 350 to 450° C., the decomposition voltage of the nitrous oxide is gradually decreased as the element temperature is increased. When the element temperature becomes higher than 450° C., the thermal decomposition of the nitrous oxide is started. Thus, in the range in which the element temperature is higher than 450° C., the decomposition voltage of the nitrous oxide is rapidly decreased. In the range in which the element temperature is 340 to 470° C., as the element temperature is increased, the decomposition voltage of the nitric oxide is gradually decreased. That is, in the range in which the element temperature is 340 to 470° C., the nitric oxide is easy to decompose by electrolysis. The nitric oxide decomposes by electrolysis using the following equation.

$$2NO+4e \rightarrow N_2+2O^{2-}$$

Figure 4:
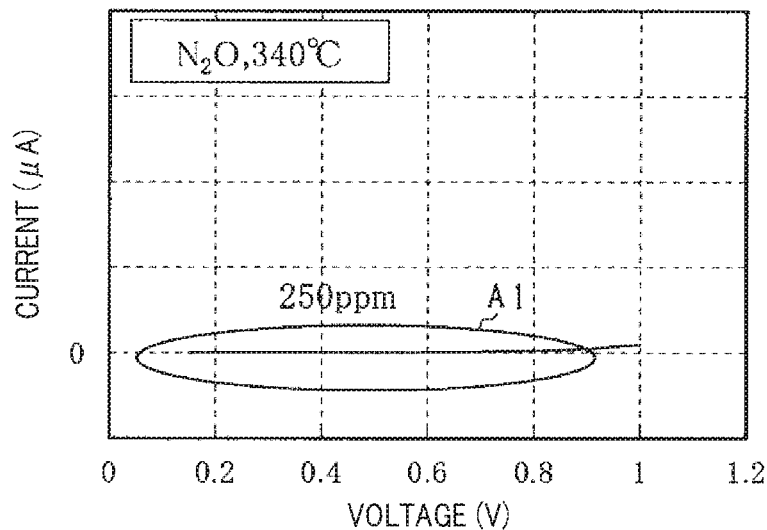
FIG. 4 is a graph showing the relationship between the applied voltage and the element current of nitrous oxide at 340° C.
Figure 5:
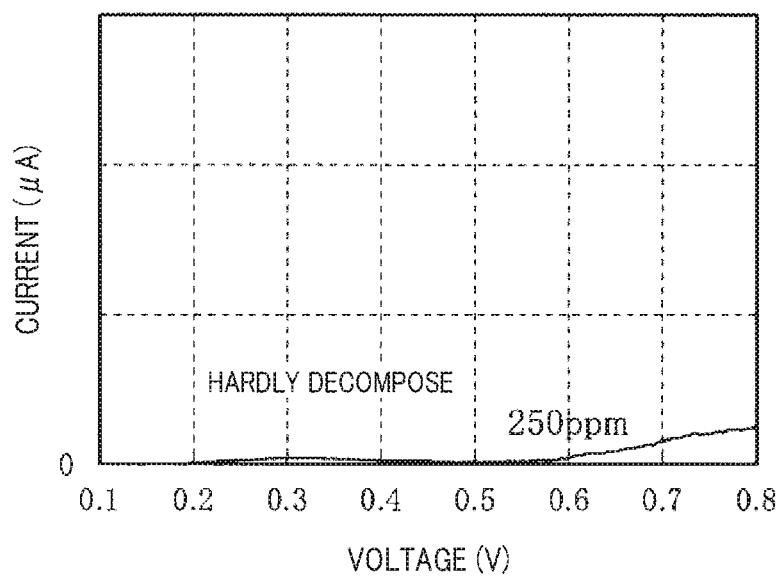
FIG. 5 is an enlarged graph showing section A1 of FIG. 4.

FIG. 4 is a graph showing the relationship between the applied voltage and the element current of the nitrous oxide at 340° C. FIG. 5 is an enlarged graph showing section A1 of FIG. 4. The graph shows a case in which the concentration of the nitrous oxide is 250 ppm.

As shown in the graphs, with the element temperature set to 340° C., even if the applied voltage is increased to 0.8 V, the element current hardly flows. That is, with the element temperature set to 340° C., even if the applied voltage is increased to 0.8 V, the nitrous oxide hardly decomposes by electrolysis.

Figure 6:
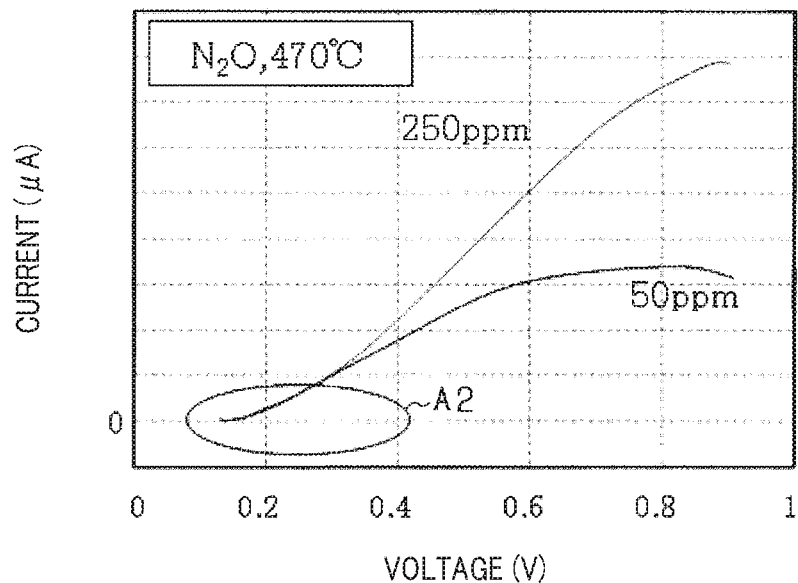
FIG. 6 is a graph showing the relationship between the applied voltage and the element current of nitrous oxide at 470° C.
Figure 7:
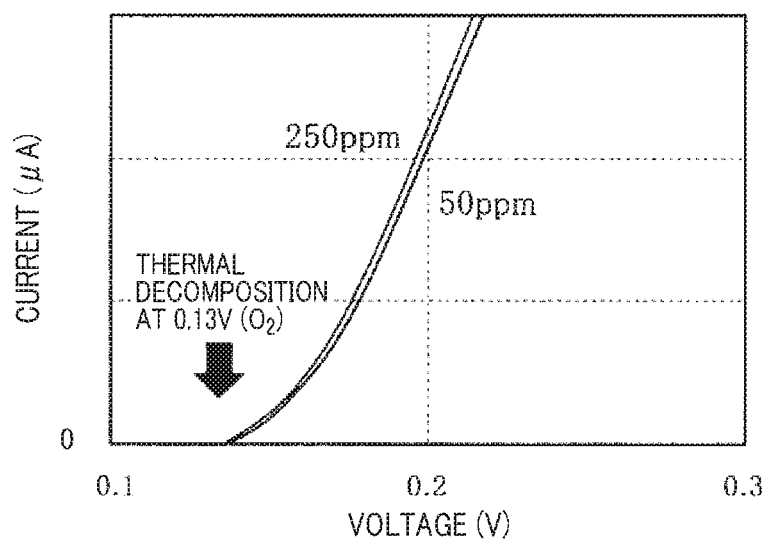
FIG. 7 is an enlarged graph showing section A2 of FIG. 6.

FIG. 6 is a graph showing the relationship between the applied voltage and the element current of the nitrous oxide at 470° C. FIG. 7 is an enlarged graph showing section A2 of FIG. 6. The graphs show cases in which the concentration of the nitrous oxide is 50 ppm and 250 ppm.

As shown in the graphs, with the element temperature set to 470° C., in either the case in which the concentration of the nitrous oxide is 50 ppm or the case in which the concentration of the nitrous oxide is 250 ppm, when the applied voltage exceeds 0.13 V, the element current is rapidly increased. That is, with the element temperature set to 470° C., when the applied voltage exceeds 0.13 V, the nitrous oxide undergoes the thermal decomposition.

In this manner, as shown in FIG. 3, in the range in which the element temperature is 350 to 450° C., setting the applied voltage to a voltage (first voltage) higher than the decomposition voltage of the nitric oxide and lower than the decomposition voltage of the nitrous oxide achieves a first state in which the nitric oxide undergoes electrolysis, and the nitrous oxide does not undergo electrolysis. In the range in which the element temperature is 350 to 450° C., setting the applied voltage to a voltage (second voltage) higher than the decomposition voltage of the nitrous oxide achieves a second state in which the nitric oxide and the nitrous oxide undergo electrolysis. Furthermore, in the range in which the element temperature is 350 to 450° C., the nitrous oxide does not undergo thermal decomposition. Thus, even if the applied voltage is made higher than the decomposition voltage of the nitrous oxide, the element current caused by neither the electrolysis of the nitric oxide nor the electrolysis of the nitrous oxide is inhibited from flowing. Therefore, in the present embodiment, the range in which the element temperature is 350 to 450° C. is referred to as a detection temperature range (first temperature) in which the nitrous oxide concentration is detected. More specifically, the control unit 50 detects the nitrous oxide concentration with the element temperature set to 400° C. (first temperature).

Figure 8:
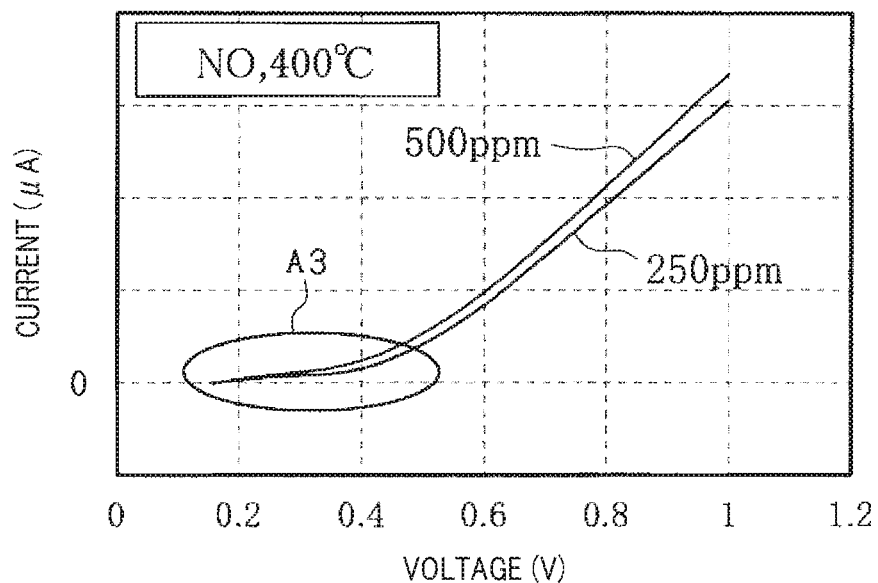
FIG. 8 is a graph showing the relationship between the applied voltage and the element current of nitric oxide at 400° C.
Figure 9:
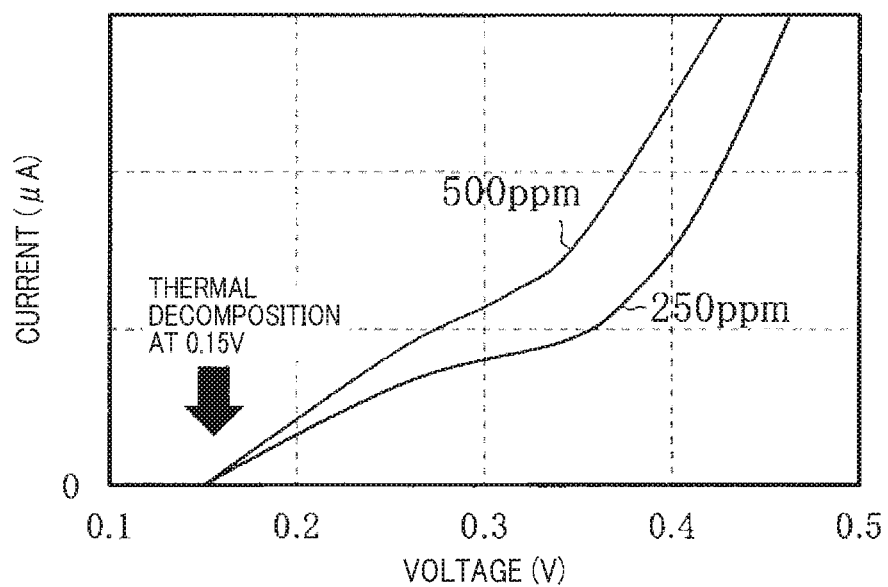
FIG. 9 is an enlarged graph showing section A3 of FIG. 8.

FIG. 8 is a graph showing the relationship between the applied voltage and the element current of the nitric oxide at 400° C. FIG. 9 is an enlarged graph showing section A3 of FIG. 8. The graphs show cases in which the concentration of the nitric oxide is 250 ppm and 500 ppm.

As shown in the graphs, with the element temperature set to 400° C., in either the case in which the concentration of the nitrous oxide is 250 ppm or the case in which the concentration of the nitrous oxide is 500 ppm, the element current gradually increases when the applied voltage becomes higher than 0.15 V. That is, with the element temperature set to 400° C., the nitric oxide undergoes electrolysis when the applied voltage becomes higher than 0.15 V.

Figure 10:
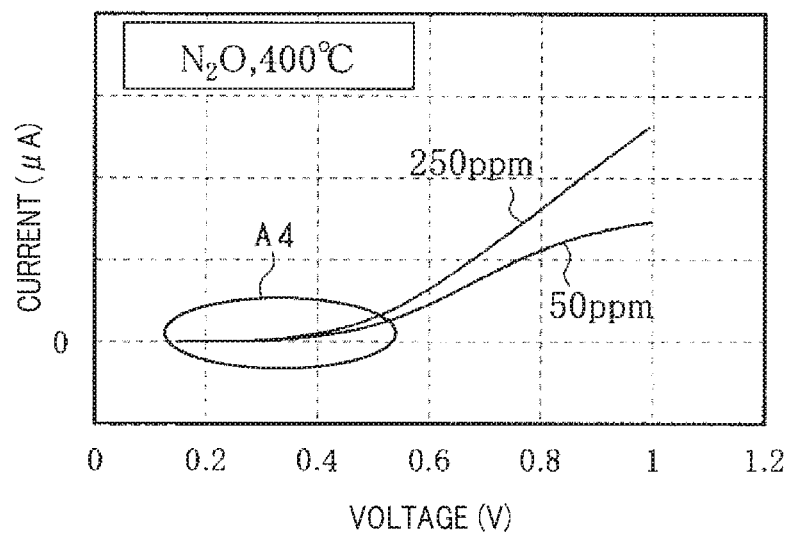
FIG. 10 is a graph showing the relationship between the applied voltage and the element current of nitrous oxide at 400° C.
Figure 11:
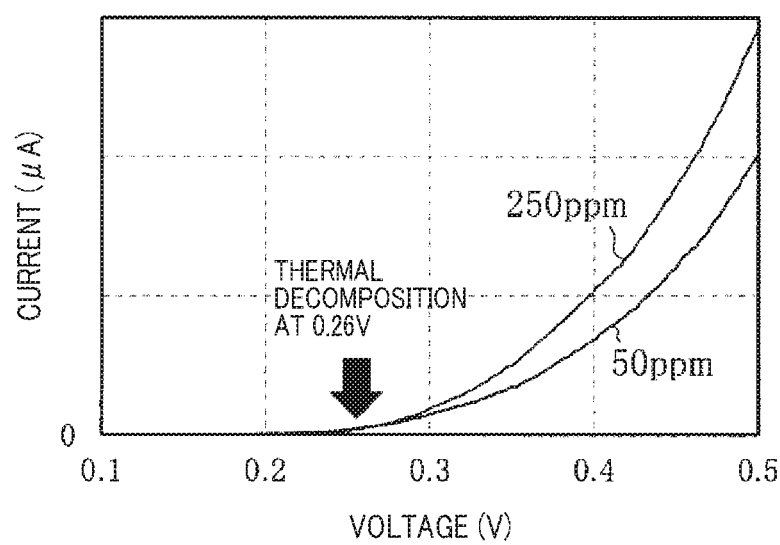
FIG. 11 is an enlarged graph showing section A4 of FIG. 10.

FIG. 10 is a graph showing the relationship between the applied voltage and the element current of the nitrous oxide at 400° C. FIG. 11 is an enlarged graph showing section A4 of FIG. 10. The graphs show cases in which the concentration of the nitrous oxide is 50 ppm and 250 ppm.

As shown in the graphs, with the element temperature set to 400° C., in either the case in which the concentration of the nitrous oxide is 50 ppm or the case in which the concentration of the nitrous oxide is 250 ppm, the element current gradually increases when the applied voltage becomes higher than 0.26 V. That is, with the element temperature set to 400° C., the nitrous oxide undergoes electrolysis when the applied voltage becomes higher than 0.26 V.

Thus, with the element temperature set to 400° C., setting the applied voltage to 0.15 to 0.26 V (first voltage) achieves the first state in which the nitric oxide undergoes electrolysis, and the nitrous oxide does not undergo electrolysis. Furthermore, with the element temperature set to 400° C., setting the applied voltage to be higher than 0.26 V achieves the second state in which the nitric oxide and the nitrous oxide undergo electrolysis.

Figure 12:
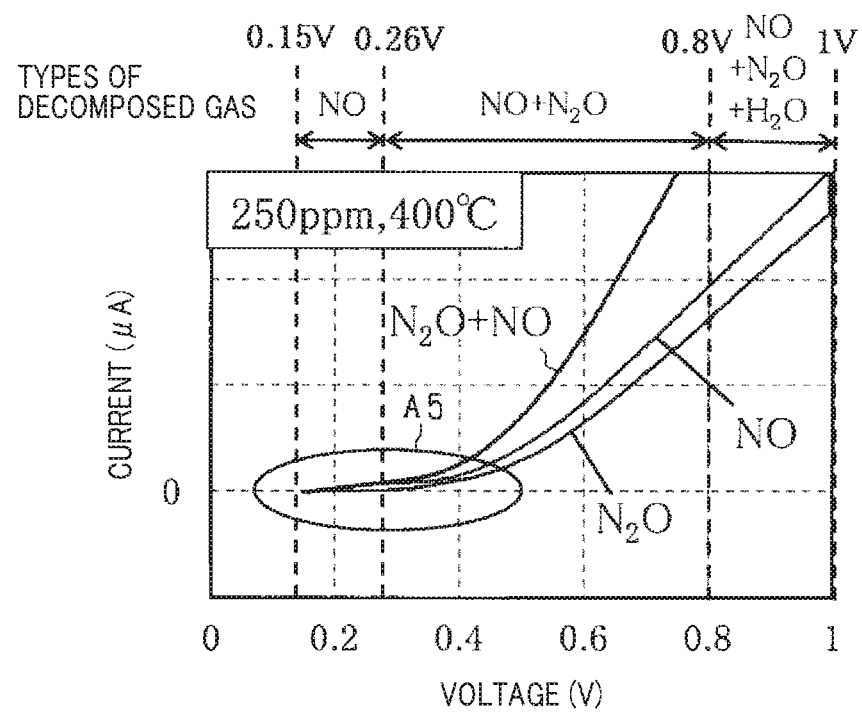
FIG. 12 is a graph showing the relationship between the applied voltage and the element current at 400° C.
Figure 13:
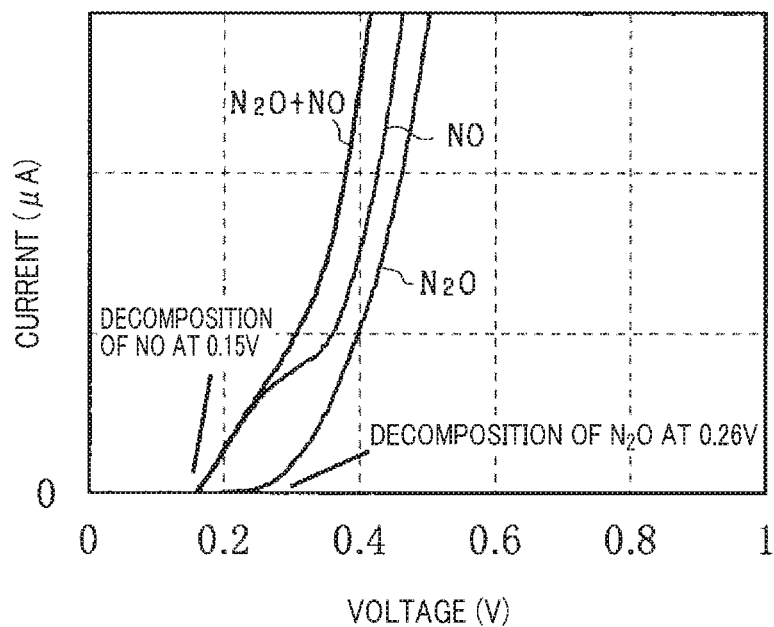
FIG. 13 is an enlarged graph showing section A5 of FIG. 12.

FIG. 12 is a graph showing the relationship between the applied voltage and the element current at 400° C. FIG. 13 is an enlarged graph showing section A5 of FIG. 12. The graphs show a case in which the concentrations of the nitric oxide and the nitrous oxide are 250 ppm. In the graphs, "$N_2O$" represents the element current ($N_2O$ current) caused due to the electrolysis of the nitrous oxide, and "NO" represents the element current (NO current) caused due to the electrolysis of the nitric oxide. In the graphs, "$N_2O+NO$" represents the total current of the $N_2O$ current and the NO current. Furthermore, the types of gas decomposed in each range of the applied voltage are indicated above the graph.

As shown in the graphs, with the element temperature set to 400° C., when the applied voltage is in the range of 0.15 to 0.26 V, the nitric oxide undergoes electrolysis, and the nitrous oxide does not undergo electrolysis. Thus, when the applied voltage is in the range of 0.15 to 0.26 V, the NO current and the total current match each other. When the applied voltage becomes higher than 0.26 V, the $N_2O$ current starts to increase, so that the total current becomes the sum of the NO current and the $N_2O$ current. Thus, the total current becomes greater than NO current. With the element temperature set to 400° C., when the applied voltage is in a range higher than 0.26 V, the nitric oxide and the nitrous oxide undergo electrolysis.

However, as shown in FIG. 12, when the applied voltage becomes higher than 0.80 V, water ($H_2O$) starts to undergo electrolysis. Thus, in the range in which the applied voltage is higher than 0.80 V, the element current caused by the electrolysis of water, that is, the element current caused by neither the electrolysis of the nitric oxide nor the electrolysis of the nitrous oxide flows. Thus, in the present embodiment, the element temperature is set to 400° C., and the applied voltage is set to 0.26 to 0.8 V (second voltage) to achieve the second state in which the nitric oxide and the nitrous oxide undergo electrolysis. More specifically, the control unit 50 sets the element temperature to 400° C. and the applied voltage to 0.50 V (second voltage) to achieve the second state.

In general, the time required to change the element temperature to stabilize at a predetermined temperature is longer than the time required to change the applied voltage to stabilize at a predetermined voltage. Given these factors, in the present embodiment, the control unit 50 achieves the first state by controlling the heater 25 to set the element temperature to the first temperature and controlling the switch 33 to apply the first voltage as the applied voltage. The control unit 50 achieves the second state by controlling the heater 25 to maintain the element temperature at the above first temperature and controlling the switch 33 to apply the second voltage, which is higher than the first voltage, as the applied voltage.

Figure 14:
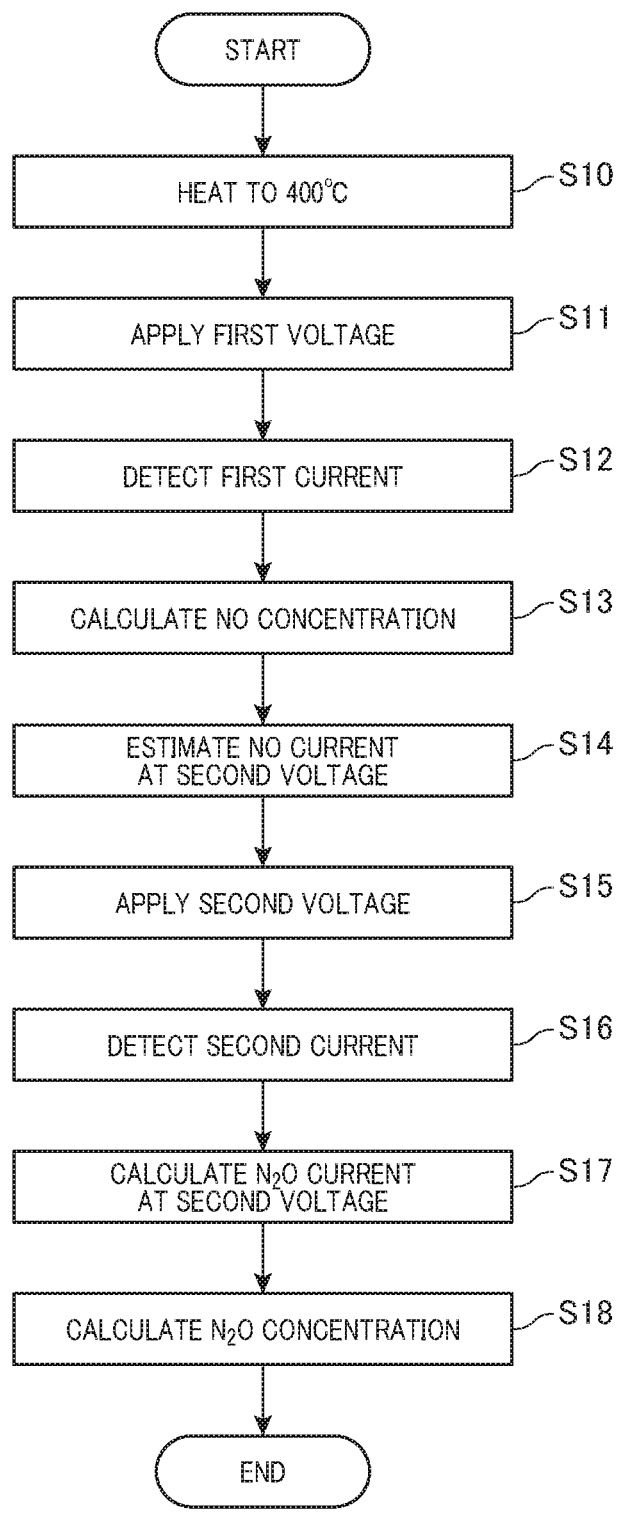
FIG. 14 is a flowchart showing a procedure for detecting nitrous oxide concentration.

FIG. 14 is a flowchart showing the procedure for detecting the nitrous oxide concentration. The control unit 50 executes this series of steps in a predetermined cycle.

First, the heater 25 is controlled to maintain the element temperature at 400° C. (S10). The first voltage is applied as the applied voltage (S11). More specifically, the switch 33 is switched to the first power supply 31, and a voltage of 0.2 V is applied as the applied voltage. Subsequently, the ammeter 40 detects a first current I1 as the element current at the first voltage (first state) (S12).

Figure 15:
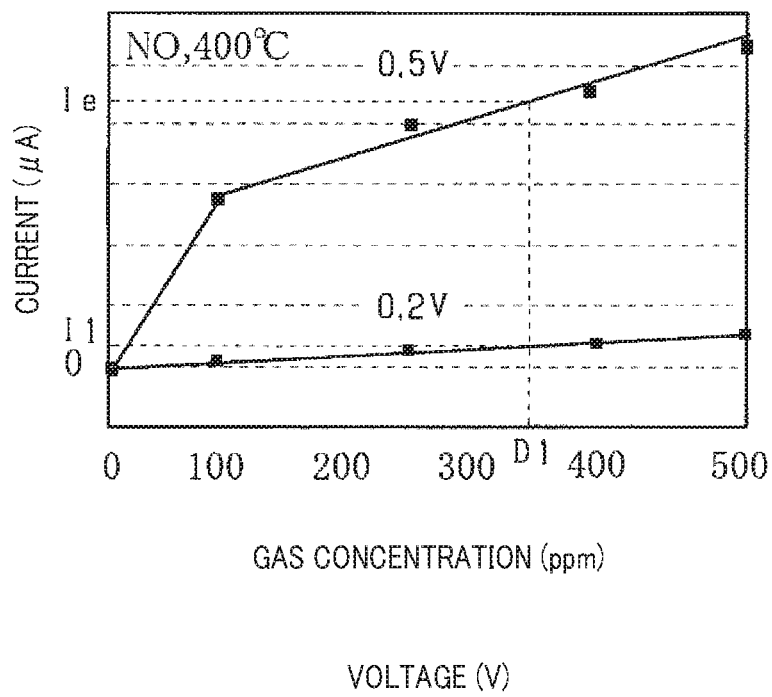
FIG. 15 is a graph showing a first relationship.

Subsequently, a nitric oxide concentration D1 is calculated based on the first current I1. (S13). More specifically, as shown in FIG. 15, a first relationship is previously set. The first relationship is the relationship between the nitric oxide concentration, the element current that flows due to the electrolysis of the nitric oxide at the first voltage (0.2 V), and the element current that flows due to the electrolysis of the nitric oxide at the second voltage (0.5 V). The first current I1 detected by the ammeter 40 at the first voltage is applied to the first relationship to calculate the nitric oxide concentration D1. The first relationship can be previously set based on, for example, experiments.

Subsequently, a NO current Ie (estimated current) at the second voltage (second state) is estimated based on the nitric oxide concentration D1 (S14). More specifically, as shown in FIG. 15, the NO current Ie at the second voltage (0.5 V) is estimated by applying the nitric oxide concentration D1 to the first relationship.

Subsequently, the second voltage is applied as the applied voltage (S15). More specifically, the switch 33 is switched to the second power supply 32, and a voltage of 0.5 V is applied as the applied voltage. Subsequently, the ammeter 40 detects a second current I2 as the element current at the second voltage (second state) (S16). An $N_2O$ current I3 (third current) at the second voltage is calculated by subtracting the NO current Ie from the second current I2 (S17).

Figure 16:
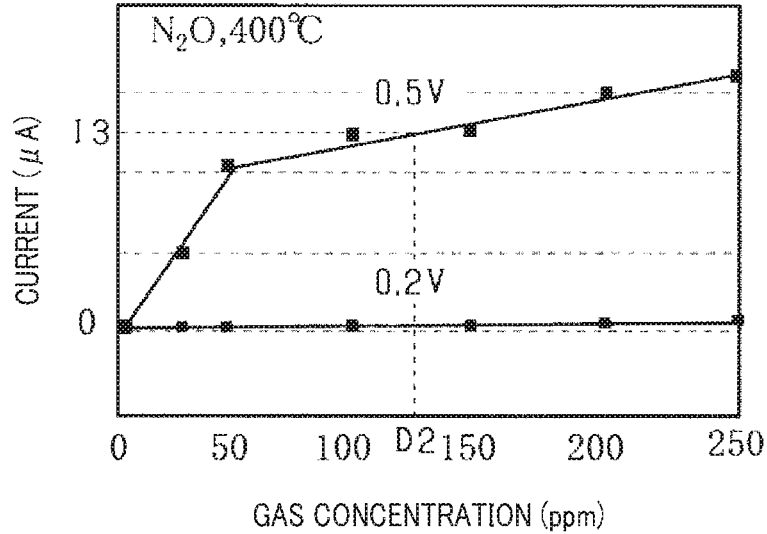
FIG. 16 is a graph showing a second relationship.

Subsequently, a nitrous oxide concentration D2 is calculated based on the $N_2O$ current I3 at the second voltage (S18). More specifically, as shown in FIG. 16, the second relationship, which is the relationship between the nitrous oxide concentration and the element current that flows due to the electrolysis of the nitrous oxide at the second voltage (0.5 V), is previously set. The $N_2O$ current I3 at the second voltage is applied to the second relationship to calculate the nitrous oxide concentration D2. The second relationship can be previously set based on, for example, experiments. Subsequently, the series of steps are temporarily suspended (END).

Figure 1B:
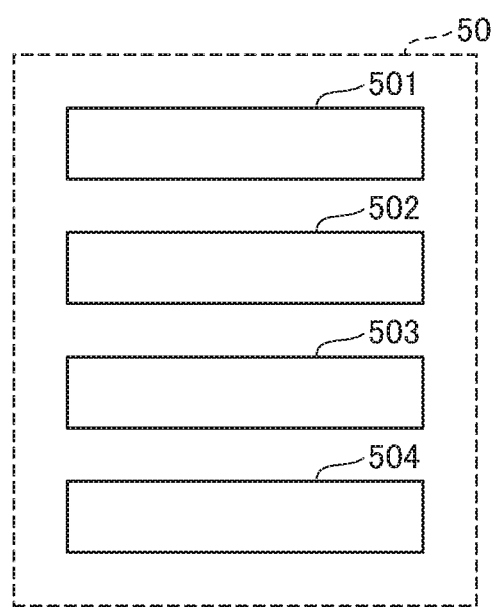
FIG. 1B is a functional block diagram of a control unit of the nitrous oxide concentration detector.

As shown in FIG. 1B, the control unit 50 includes, as functional blocks that can be implemented by the CPU executing programs stored in the ROM or the like, a first control section 501, a second control section 502, an estimation section 503, and a calculation section 504. The processes of S10 and S11 correspond to the processes performed by the first control section 501, the processes of S10 and S15 correspond to the processes performed by the second control section 502, the processes of S12 to S14 correspond to the processes performed by the estimation section 503, and the processes of S16 to S18 correspond to the processes performed by the calculation section 504. These functional blocks may be implemented by software only as above, hardware only, or a combination thereof. For example, when these functions are provided by an electronic circuit which is hardware, the electronic circuit can be provided by a digital circuit including many logic circuits, an analog circuit, or a combination thereof.

Figure 17:
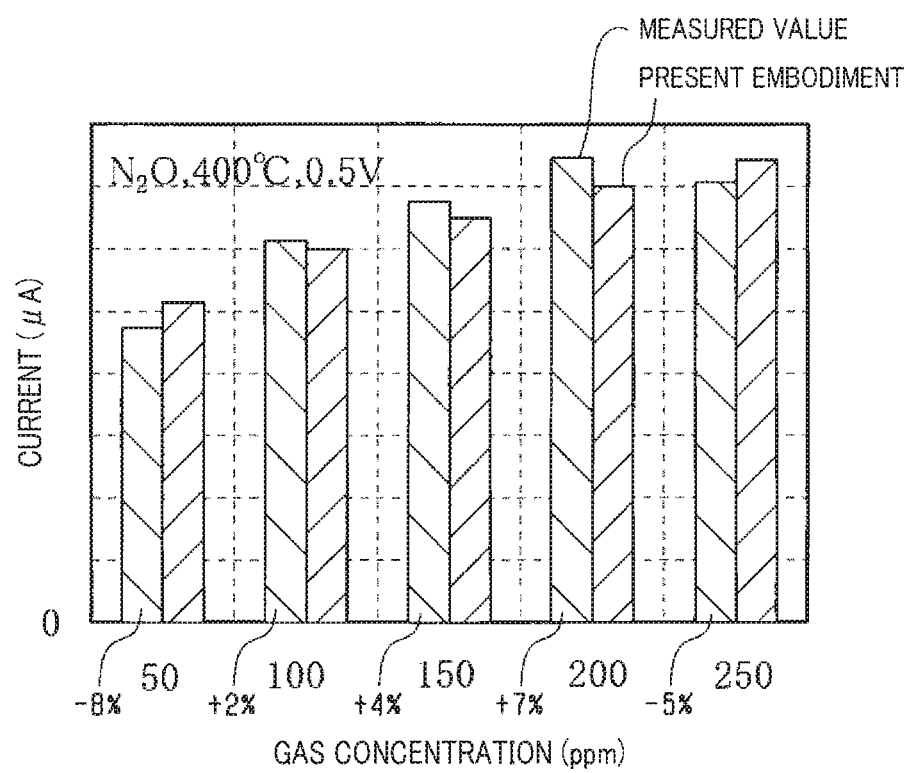
FIG. 17 is a graph showing an $N_2O$ current at a second voltage associated with each nitrous oxide concentration according to the present embodiment and measured values.

FIG. 17 is a graph showing the $N_2O$ current at the second voltage associated with each nitrous oxide concentration according to the present embodiment and measured values. As shown in the graph, in each nitrous oxide concentration, the difference between the $N_2O$ current at the second voltage according to the present embodiment and the $N_2O$ current at the second voltage according to the measured value is within ±8%. That is, in each nitrous oxide concentration, the present embodiment detects the nitrous oxide concentration with an error within ±8%.

The present embodiment described above has the following advantages.

The NO current that flows between the detection electrode 23 and the reference electrode 24 due to the electrolysis of the nitric oxide in the first state correlates with the NO current that flows between the detection electrode 23 and the reference electrode 24 due to the electrolysis of the nitric oxide in the second state. Thus, the estimation section estimates the NO current Ie that flows between the detection electrode 23 and the reference electrode 24 due to the electrolysis of the nitric oxide in the second state based on the first current I1 detected by the ammeter 40 in the first state.

The third current I3, which is obtained by subtracting the NO current Ie estimated by the estimation section from the second current I2 detected by the ammeter 40 in the second state, corresponds to the $N_2O$ current that flows between the detection electrode 23 and the reference electrode 24 due to the electrolysis of the nitrous oxide in the second state. The third current I3 is a current that excludes the NO current caused due to the electrolysis of the nitric oxide, and the third current I3 correlates with the nitrous oxide concentration. Thus, even if the nitric oxide is present, the calculation section accurately detects the nitrous oxide concentration D2 based on the third current I3.

The first control section achieves the first state by controlling the switch 33 and the heater 25 to set the temperature of the solid electrolyte 22 to the first temperature and to apply the first voltage between the detection electrode 23 and the reference electrode 24. The second control section achieves the second state by controlling the switch 33 and the heater 25 to set the temperature of the solid electrolyte 22 to the first temperature and to apply the second voltage, which is higher than the first voltage, between the detection electrode 23 and the reference electrode 24. Since the temperature of the solid electrolyte 22 does not need to be changed between the first state and the second state, and only the applied voltage needs to be changed, the nitrous oxide concentration D2 is detected in a short time.

The first temperature is set within the range of 350 to 450° C. This achieves the second state in which the nitric oxide and the nitrous oxide undergo electrolysis and inhibits the detection accuracy of the nitrous oxide concentration D2 from being decreased.

The first temperature is set to 400° C., and the first voltage is set within the range of 0.15 to 0.26 V. This achieves the first state in which the nitric oxide undergoes electrolysis, and the nitrous oxide does not undergo electrolysis.

The first temperature is set to 400° C., and the second voltage is set within the range of 0.26 to 0.80 V. This achieves the second state in which the nitric oxide and the nitrous oxide undergo electrolysis and inhibits the detection accuracy of the nitrous oxide concentration D2 from being decreased.

The first relationship is previously set. The first relationship is the relationship between the concentration of the nitric oxide, the NO current that flows between the detection electrode 23 and the reference electrode 24 caused due to the electrolysis of the nitric oxide in the first state, and the NO current that flows between the detection electrode 23 and the reference electrode 24 caused due to the electrolysis of the nitric oxide in the second state. The estimation section estimates the above NO current Ie based on the first relationship and the first current I1, which is detected by the ammeter 40 in the first state. That is, the nitric oxide concentration D1 is calculated by applying the first current I1, which is detected by the ammeter 40 in the first state, to the first relationship. The current that flows between the detection electrode 23 and the reference electrode 24 caused due to the electrolysis of the nitric oxide in the second state, that is, the NO current Ie is estimated by applying the calculated nitric oxide concentration D1 to the first relationship.

The second relationship is previously set. The second relationship is the relationship between the nitrous oxide concentration and the $N_2O$ current that flows between the detection electrode 23 and the reference electrode 24 due to the electrolysis of the nitrous oxide in the second state. The calculation section calculates the nitrous oxide concentration D2 based on the second relationship and the above third current I3. That is, the nitrous oxide concentration D2 is calculated by applying the third current I3, which corresponds to the $N_2O$ current that flows between the detection electrode 23 and the reference electrode 24 due to the electrolysis of the nitrous oxide in the second state, to the second relationship.

Modifications

The above embodiment may be modified as follows. The same reference numerals are given to those components that are the same as the corresponding components of the above embodiment, and detailed explanations are omitted.

The solid electrolyte 22 (electrolyte) may be formed of calcium oxide (CaO) stabilized zirconia (CSZ) having oxygen ion conductivity into a plate. In this case, the detection electrode 23 (first electrode) is preferably formed of platinum (Pt) into a plate, and the reference electrode 24 (second electrode) is preferably formed of CSZ and platinum into a plate.

In the above embodiment, as shown in FIG. 15, the first relationship, which is the relationship between the nitric oxide concentration, the element current that flows due to the electrolysis of the nitric oxide in the first state (400° C., 0.2 V), and the element current that flows due to the electrolysis of the nitric oxide in the second state (400° C., 0.5 V), is previously set as a graph. In contrast, the first relationship may be previously set as a mathematical expression.

In the above embodiment, as shown in FIG. 16, the second relationship, which is the relationship between the nitrous oxide concentration and the element current that flows due to the electrolysis of the nitrous oxide in the second state (400° C., 0.5 V), is previously set as a graph. In contrast, the second relationship may be previously set as a mathematical expression.

In the above embodiment, the first temperature is set to 400° C., and the first voltage is set within the range of 0.15 to 0.26 V. In contrast, the first temperature may be set to a temperature T1 other than 400° C. within the range of 350 to 450° C., and the first voltage may be set to a voltage corresponding to the temperature T1. That is, the first temperature may be set to the temperature T1, and the first voltage may be set to a voltage at which the nitric oxide undergoes electrolysis, and the nitrous oxide does not undergo electrolysis at the temperature T1.

In the above embodiment, the first temperature is set to 400° C., and the second voltage is set within the range of 0.26 to 0.80 V. In contrast, the first temperature may be set to the temperature T1 other than 400° C. within the range of 350 to 450° C., and the second voltage may be set to a voltage corresponding to the temperature T1. That is, the first temperature may be set to the temperature T1, and the second voltage may be set to a voltage at which the nitric oxide and the nitrous oxide undergo electrolysis at the temperature T1.

In the above embodiment, the first control section controls the switch 33 and the heater 25 to set the temperature of the solid electrolyte 22 to the first temperature and to apply the first voltage between the detection electrode 23 and the reference electrode 24, so that the first state is achieved. The second control section controls the switch 33 and the heater 25 to set the temperature of the solid electrolyte 22 to the first temperature and to apply the second voltage, which is higher than the first voltage, between the detection electrode 23 and the reference electrode 24, so that the second state is achieved.

In contrast, the first control section may achieve the first state similarly to the above, and the second control section may control the switch 33 and the heater 25 to set the temperature of the solid electrolyte 22 to a second temperature, which is higher than the first temperature, and to apply the first voltage between the detection electrode 23 and the reference electrode 24, so that the second state is achieved. In this case, as shown in FIG. 3, the first voltage may be set to 0.25 V for example, and the first temperature only needs to be set in the temperature range in which the decomposition voltage of the nitric oxide becomes less than 0.25 V, and the decomposition voltage of the nitrous oxide becomes higher than 0.25 V. Additionally, the second temperature only needs to be set in the temperature range in which the decomposition voltage of the nitrous oxide becomes less than 0.25 V.

In the above embodiment, the first power supply 31, the second power supply 32, and the switch 33 configure the voltage application section. Instead, a variable voltage power supply that variably applies a voltage may be employed as the voltage application section. The first control section may achieve the first state similarly to the above, and the second control section may control the switch 33 and the heater 25 to set the temperature of the solid electrolyte 22 to the second temperature and to apply the second voltage between the detection electrode 23 and the reference electrode 24, so that the second state is achieved. In short, the first control section only needs to set the first temperature and the first voltage so that the decomposition voltage of the nitric oxide is less than the first voltage, and the decomposition voltage of the nitrous oxide is higher than the first voltage. Furthermore, the second control section only needs to set the second temperature and the second voltage so that the decomposition voltage of the nitric oxide and the decomposition voltage of the nitrous oxide are less than the second voltage.

Two sets of the detection electrode 23 (first electrode), the solid electrolyte 22 (electrolyte), the reference electrode 24 (second electrode), the voltage application section, and the heater 25 may be employed. The control unit 50 may set one of the sets to the first state and the other set to the second state. The nitrous oxide concentration may be detected from the operation result of the two sets. With this configuration, the nitrous oxide concentration detector can achieve the first state and the second state simultaneously, so that the nitrous oxide concentration is promptly detected.

In summary, a first aspect of the disclosure provides a nitrous oxide concentration detector (10) including: a first electrode (23); an electrolyte (22) including oxygen ion conductivity; a second electrode (24) connected to the first electrode through the electrolyte; a voltage application section (31, 32, 33), which applies a voltage between the first electrode and the second electrode; a heater (25), which heats the electrolyte; a current detector (40), which detects current that flows between the first electrode and the second electrode; and a control unit (50), which controls the voltage application section and the heater. In the nitrous oxide concentration detector, the control unit includes: a first control section (501), which controls the voltage application section and the heater to achieve a first state in which nitric oxide undergoes electrolysis and nitrous oxide does not undergo electrolysis, a second control section (502), which controls the voltage application section and the heater to achieve a second state in which nitric oxide and nitrous oxide undergo electrolysis, an estimation section (503), which estimates an estimated current that flows between the first electrode and the second electrode due to electrolysis of nitric oxide in the second state based on a first current detected by the current detector in the first state, and a calculation section (504), which calculates a nitrous oxide concentration based on a third current obtained by subtracting the estimated current estimated by the estimation section from a second current detected by the current detector in the second state.

With the above configuration, the voltage application section applies a voltage between the first electrode and the second electrode, which is connected to the first electrode through the electrolyte. Furthermore, the heater heats the electrolyte. The voltage application section and the heater are controlled by the control unit. If at least one of nitric oxide and nitrous oxide undergoes electrolysis in the first electrode or the second electrode, a current flows between the first electrode and the second electrode through the electrolyte having the oxygen ion conductivity. The current that flows between the first electrode and the second electrode is detected by the current detector.

The first control section controls the voltage application section and the heater to achieve the first state in which the nitric oxide undergoes electrolysis, and the nitrous oxide does not undergo electrolysis. In the first state, the current caused by the electrolysis of the nitric oxide flows between the first electrode and the second electrode, and the current caused by the electrolysis of the nitrous oxide does not flow between the first electrode and the second electrode. Furthermore, the second control section controls the voltage application section and the heater to achieve the second state in which the nitric oxide and the nitrous oxide undergo electrolysis. In the second state, the current caused by the electrolysis of the nitric oxide and the current caused by the electrolysis of the nitrous oxide flow between the first electrode and the second electrode.

The current that flows between the first electrode and the second electrode due to the electrolysis of the nitric oxide in the first state correlates with the current that flows between the first electrode and the second electrode due to the electrolysis of the nitric oxide in the second state. Thus, the estimation section estimates the estimated current that flows between the first electrode and the second electrode due to the electrolysis of the nitric oxide in the second state based on the first current detected by the current detector in the first state.

The third current obtained by subtracting the estimated current estimated by the estimation section from the second current detected by the current detector in the second state corresponds to the current that flows between the first electrode and the second electrode due to the electrolysis of the nitrous oxide in the second state. The third current is a current that excludes the current caused by the electrolysis of the nitric oxide, and the third current correlates with the nitrous oxide concentration. Thus, even if the nitric oxide is present, the calculation section accurately detects the nitrous oxide concentration based on the third current.

Whether the nitric oxide and the nitrous oxide undergo electrolysis is changed by the temperature of the electrolyte and a voltage (hereinafter, referred to as the applied voltage) applied between the first electrode and the second electrode. In general, the time required to change the temperature of the electrolyte to be stabilized at a predetermined temperature is longer than the time required to change the applied voltage to be stabilized at a predetermined voltage.

In this respect, in a second aspect, the first control section controls the voltage application section and the heater to set a temperature of the electrolyte to a first temperature and to apply a first voltage between the first electrode and the second electrode, so that the first state is achieved. The second control section controls the voltage application section and the heater to set the temperature of the electrolyte to the first temperature and to apply a second voltage, which is higher than the first voltage, between the first electrode and the second electrode, so that the second state is achieved. In this manner, since the temperature of the electrolyte does not need to be changed between the first state and the second state, and only the applied voltage needs to be changed, the nitrous oxide concentration can be detected in a short time.

The experiments conducted by the inventors of the present application revealed that if the temperature of the electrolyte becomes less than 350° C., the nitrous oxide hardly decompose regardless of the applied voltage. Additionally, if the temperature of the electrolyte becomes higher than 450° C., the thermal decomposition of the nitrous oxide is started, and the current caused due to the thermal decomposition of the nitrous oxide, that is, the current caused by neither the electrolysis of the nitric oxide nor the electrolysis of the nitrous oxide may possibly flow between the first electrode and the second electrode.

In this respect, in a third aspect, the first temperature is set within a range of 350 to 450° C. Thus, the second state is achieved in which the nitric oxide and the nitrous oxide undergo electrolysis, and the detection accuracy of the nitrous oxide concentration is inhibited from being decreased.

The experiments conducted by the inventors of the present application revealed that, with the temperature of the electrolyte set to 400° C., if the applied voltage is less than 0.15 V, the nitric oxide does not undergo electrolysis, and if the applied voltage is greater than 0.26 V, the nitrous oxide starts to undergo electrolysis.

In this respect, in a fourth aspect, the first temperature is set to 400° C., and the first voltage is set within a range of 0.15 to 0.26 V. Thus, the first state is achieved in which the nitric oxide undergoes electrolysis and the nitrous oxide does not undergo electrolysis.

The experiments conducted by the inventors of the present application revealed that, with the temperature of the electrolyte set to 400° C., if the applied voltage becomes greater than 0.80 V, water ($H_2O$) starts to undergo electrolysis, and the current caused by the electrolysis of water, that is, the current caused by neither the electrolysis of the nitric oxide nor the electrolysis of the nitrous oxide may possibly flow between the first electrode and the second electrode.

In this respect, in a fifth aspect, the first temperature is set to 400° C., and the second voltage is set within a range of 0.26 to 0.80 V. Thus, the second state is achieved in which the nitric oxide and the nitrous oxide undergo electrolysis, and the detection accuracy of the nitrous oxide concentration is inhibited from being decreased.

In a sixth aspect, the estimation section estimates the estimated current based on a first relationship, which is a predetermined relationship between a concentration of nitric oxide, a current that flows between the first electrode and the second electrode due to electrolysis of nitric oxide in the first state, and a current that flows between the first electrode and the second electrode due to electrolysis of nitric oxide in the second state, and the first current detected by the current detector in the first state.

With the above configuration, the first relationship, which is the relationship between the concentration of the nitric oxide, the current that flows between the first electrode and the second electrode due to the electrolysis of the nitric oxide in the first state, and the current that flows between the first electrode and the second electrode due to the electrolysis of the nitric oxide in the second state, is previously set. The estimation section estimates the above estimated current based on the first relationship and the first current detected by the current detector in the first state. That is, the concentration of the nitric oxide is calculated by applying the first current detected by the current detector in the first state to the first relationship. The current that flows between the first electrode and the second electrode due to the electrolysis of the nitric oxide in the second state, that is, the estimated current is estimated by applying the calculated concentration of the nitric oxide to the first relationship. The first relationship can be previously set based on, for example, experiments.

In a seventh aspect, the calculation section calculates the nitrous oxide concentration based on a second relationship, which is a predetermined relationship between the concentration of nitrous oxide and a current that flows between the first electrode and the second electrode due to electrolysis of nitrous oxide in the second state, and the third current.

With the above configuration, the second relationship, which is the relationship between the concentration of the nitrous oxide and the current that flows between the first electrode and the second electrode due to the electrolysis of the nitrous oxide in the second state, is previously set. The calculation section calculates the nitrous oxide concentration based on the second relationship and the above third current. That is, the nitrous oxide concentration is calculated by applying the third current corresponding to the current that flows between the first electrode and the second electrode due to the electrolysis of the nitrous oxide in the second state to the second relationship. The second relationship can be previously set based on, for example, experiments.

More specifically, in an eighth aspect, the electrolyte is formed of stabilized zirconia, the first electrode is formed of platinum, and the second electrode includes the stabilized zirconia.

What is claimed is:

1. A nitrous oxide concentration detector comprising:
   a first electrode;
   an electrolyte including oxygen ion conductivity;
   a second electrode connected to the first electrode through the electrolyte;
   voltage application circuitry configured to apply one of the plurality of voltages between the first electrode and the second electrode;
   a heater, which heats the electrolyte;
   a current detector, which detects current that flows between the first electrode and the second electrode; and
   a control unit, which controls the voltage application circuitry and the heater, wherein
   the control unit comprises:
      a non-transitory memory storing one or more computer programs;
      a processor configured to execute the one or more computer programs to:
         control the voltage application circuitry and the heater to achieve a first state in which nitric oxide undergoes electrolysis and nitrous oxide does not undergo electrolysis,
         control the voltage application circuitry and the heater to achieve a second state in which nitric oxide and nitrous oxide undergo electrolysis,
         estimate an estimated current that flows between the first electrode and the second electrode due to electrolysis of nitric oxide in the second state based on a first current detected by the current detector in the first state, and
         calculate a nitrous oxide concentration based on a third current obtained by subtracting the estimated current from a second current detected by the current detector in the second state.

2. The nitrous oxide concentration detector according to claim 1, wherein
   the processor is further configured to execute one or more programs to control the voltage application circuitry and the heater to set a temperature of the electrolyte to a first temperature and to apply a first voltage between the first electrode and the second electrode, so that the first state is achieved, and
   control the voltage application circuitry and the heater to set the temperature of the electrolyte to the first temperature and to apply a second voltage, which is higher than the first voltage, between the first electrode and the second electrode, so that the second state is achieved.

3. The nitrous oxide concentration detector according to claim 2, wherein
   the first temperature is set within a range of 350 to 450° C.

4. The nitrous oxide concentration detector according to claim 2, wherein
   the first temperature is set to 400° C., and
   the first voltage is set within a range of 0.15 to 0.26 V.

5. The nitrous oxide concentration detector according to claim 2, wherein
   the first temperature is set to 400° C., and
   the second voltage is set within a range of 0.26 to 0.80 V.

6. The nitrous oxide concentration detector according to claim 1, wherein
   the processor is further configured to execute one or more programs to estimate the estimated current based on a first relationship, which is a predetermined relationship between a concentration of nitric oxide, a current that flows between the first electrode and the second electrode due to electrolysis of nitric oxide in the first state, and a current that flows between the first electrode and the second electrode due to electrolysis of nitric oxide in the second state, and the first current detected by the current detector in the first state.

7. The nitrous oxide concentration detector according to claim 1, wherein
   the processor is further configured to execute one or more programs to calculates the nitrous oxide concentration based on a second relationship, which is a predetermined relationship between the concentration of nitrous oxide and a current that flows between the first electrode and the second electrode due to electrolysis of nitrous oxide in the second state, and the third current.

8. The nitrous oxide concentration detector according to claim 1, wherein
   the electrolyte is formed of stabilized zirconia,
   the first electrode is formed of platinum, and
   the second electrode includes the stabilized zirconia.

9. The nitrous oxide concentration detector according to claim 1, wherein the voltage application circuitry comprises a first power supply, a second power supply, and a switch.

10. The nitrous oxide concentration detector according to claim 1, wherein the voltage application circuitry comprises a variable voltage power supply.

* * * * *